June 12, 1934. W. J. BRADLEY 1,962,420
ELECTRIC INSECT EXTERMINATOR
Filed Dec. 22, 1932 3 Sheets-Sheet 1
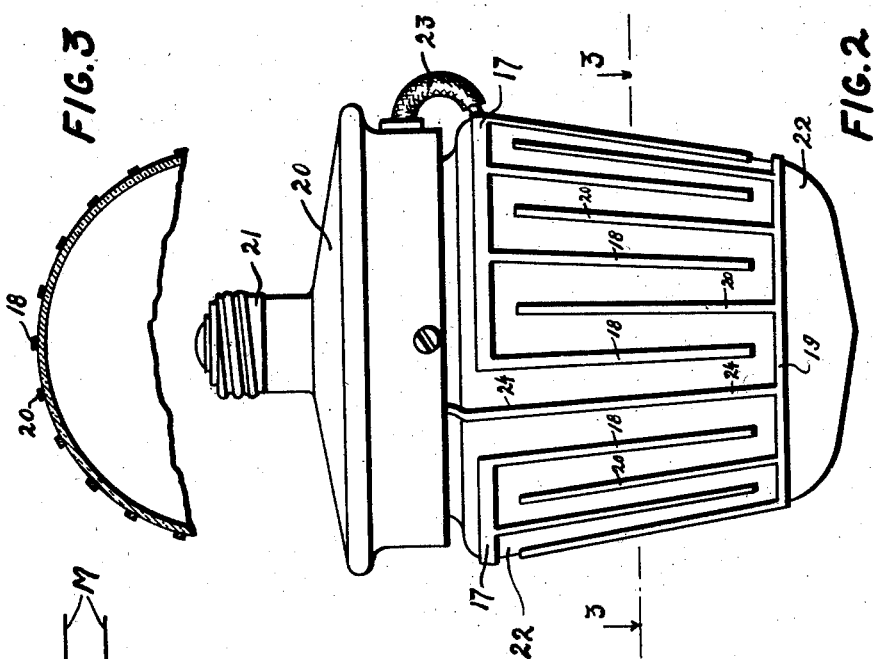
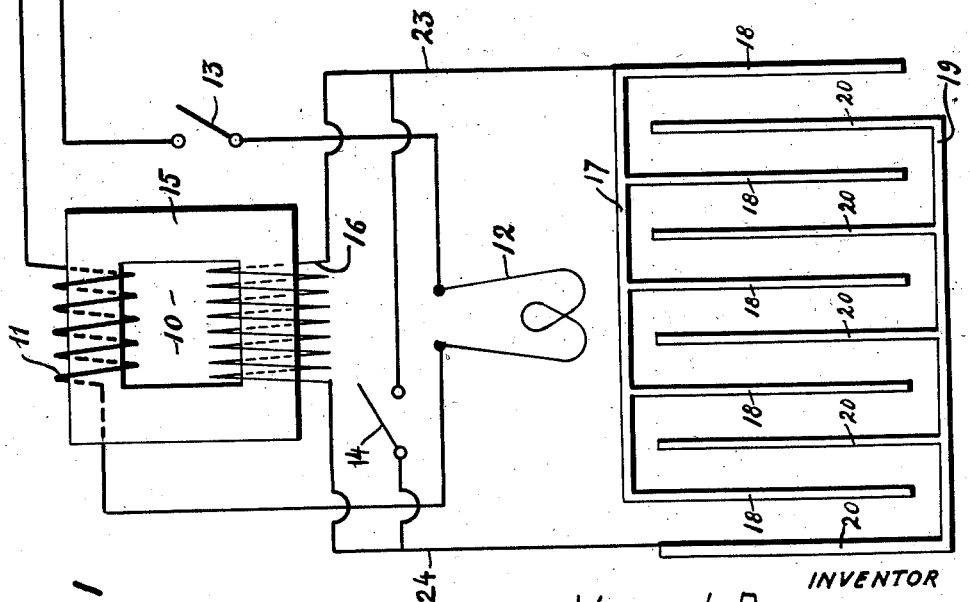
INVENTOR
WILLIAM J. BRADLEY
BY
Bohlebert Ledbetter
ATTORNEYS

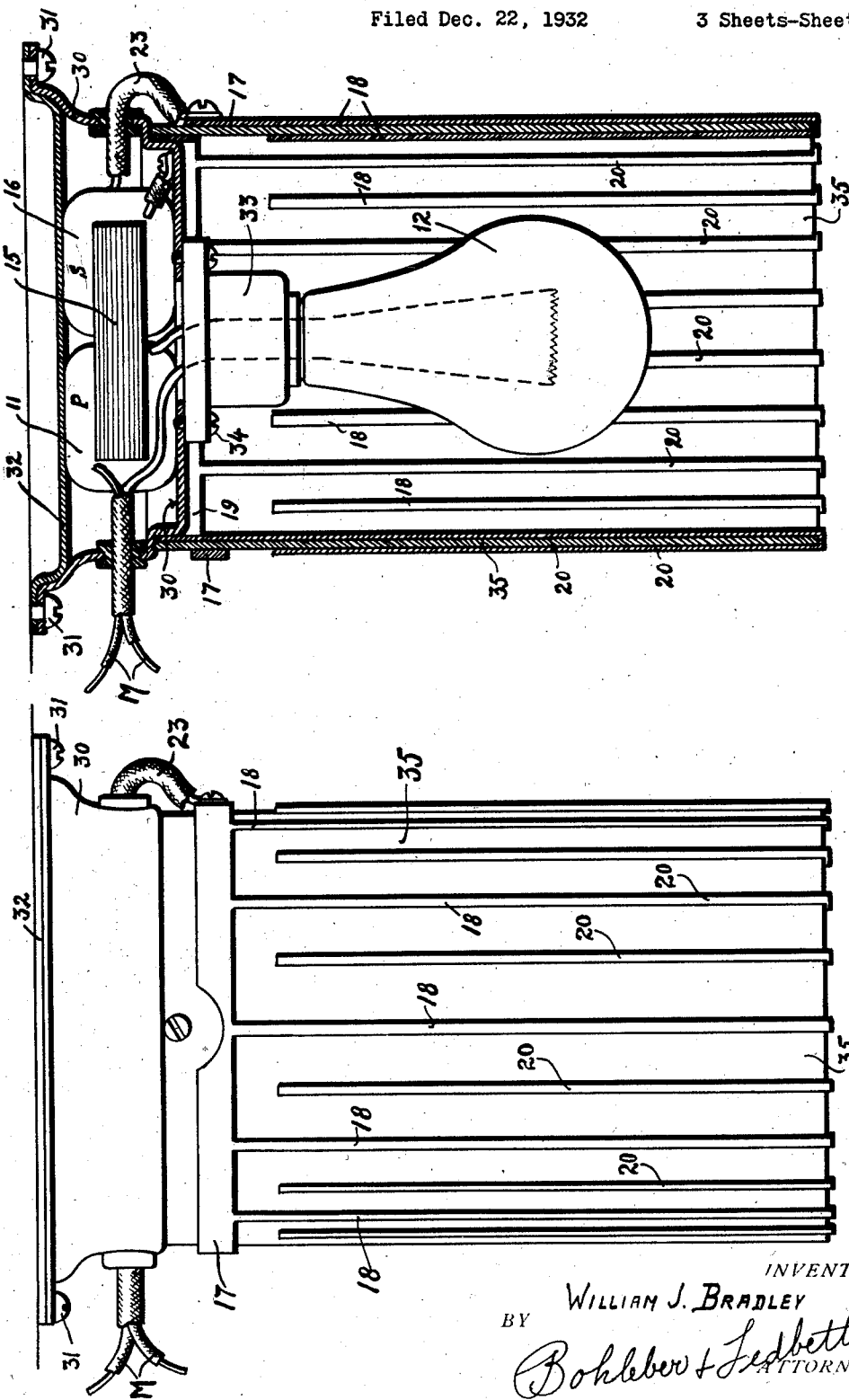

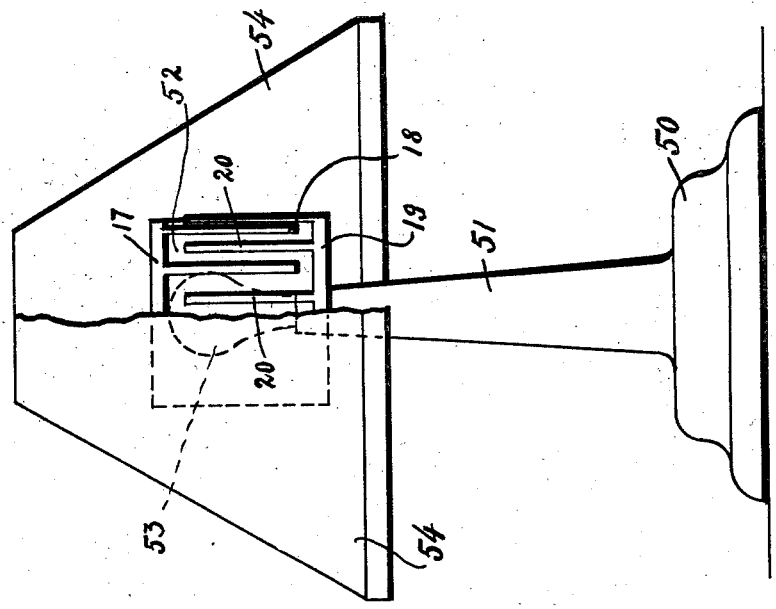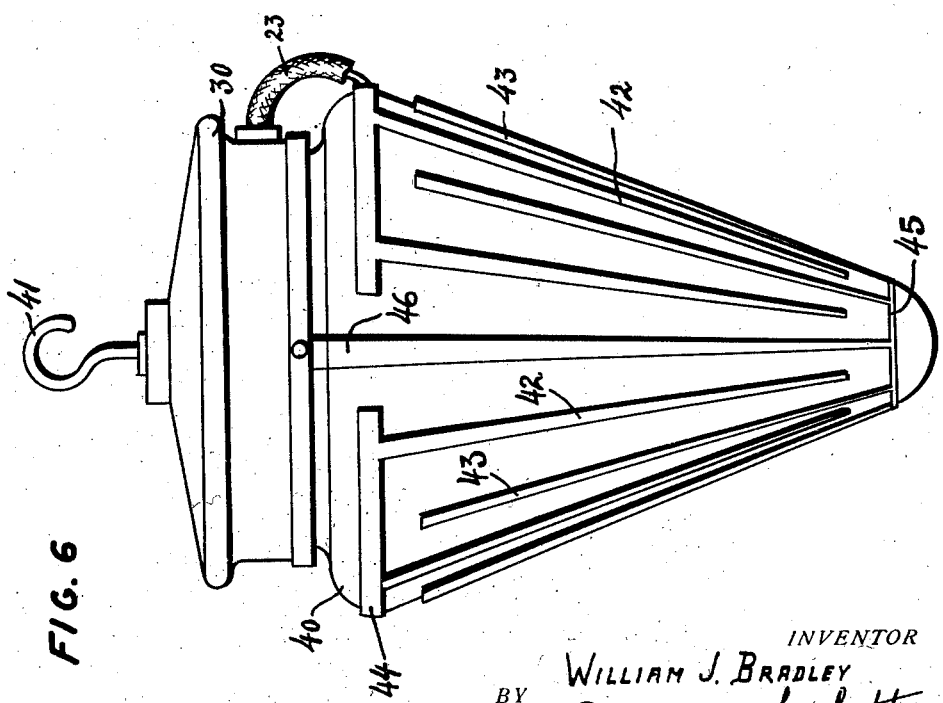

Patented June 12, 1934

1,962,420

UNITED STATES PATENT OFFICE 1,962,420

ELECTRIC INSECT EXTERMINATOR

William J. Bradley, New York, N. Y.

Application December 22, 1932, Serial No. 648,349

12 Claims. (Cl. 43—112)

This invention relates to an electrical device adapted for use as an insect exterminator, or in its preferred form the device is a combination illuminating and insect exterminating means.

An object of the present invention is to provide a satisfactorily operating practical device which lures insects into or adjacent to an electrically charged field between or in the vicinity of electrodes which carry a difference in electrical potential of high value. The electrodes are electrically connected temporarily by the inset alighting or coming between or adjacent thereto, thus electrocuting the insect by the current discharged through the insect.

Another object is to devise an insect exterminator which can be connected with the usual electric lighting circuit and is capable of producing a high electrical potential upon the insect exterminator without an excessively large and hence expensive transformer.

Another object is to provide a device which combines an electrical illuminant or incandescent lamp in series with the primary winding of a transformer and the secondary of the transformer provides a high electrical potential upon the electrical insect exterminating part of the device.

Another object is to provide a device which accomplishes the rapid extermination of insects lured thereto and in which the insect exterminating portion thereof is not injurious to the apparatus and is not a source of trouble or danger.

A further object is to construct an insect exterminating device utilizing a transformer producing a high electrical potential across the secondary winding for connection with the insect exterminating electrodes of the device and a current limiting means in series with the primary winding of the transformer.

These objects and others are accomplished by the invention as will be apparent from the following description and drawings which describe and illustrate various forms of the invention so that anyone skilled in the art may practice the invention.

The insect exterminator or electrocuting means may comprise an electrode having one or more metallic members or conductors connected to one end of the secondary coil or winding of a transformer and another electrode having one or more metallic members or conductors connected to the other end of the secondary coil of the transformer. The transformer applies a high electrical potential upon the electrodes so that they are highly charged and have a high potential electrical field thereabout. The charged electrodes are positioned in adjacent spaced relation and are so mounted that the electrodes and specifically the conductors are easily accessible to insects. The electrodes or their conductors are spaced apart a distance great enough so that the electrical potential applied thereto will not cause an electrical discharge across the space or gap between the electrodes and so that insects, such as flies, moths, mosquitoes and the like upon alighting between or upon the charged members will complete a circuit between the spaced electrodes through the insect. At the potential impressed upon the electrodes or conductors an insect need not touch any of the electrodes or the lamp shade in order to electrically connect them and thereby cause a small current to flow through and electrocuted the insect. In fact, an insect flying close to the electrodes in the electrical field thereabout will electrically connect the electrodes through the insect as a result of the breakdown of the air gap, even though the insect has not passed between the electrodes or alighted thereupon.

An electrical insect exterminator in order to be effective must have a high voltage impressed upon the spaced and charged electrodes. The farther the electrodes are spaced apart, the greater must be the voltage applied thereto in order to electrically connect the conductors through an insect adjacent thereto or thereon. The electrodes or their conductors spaced about three eighths of an inch apart should have a voltage applied thereto sufficient to cause an electric discharge very nearly three eighths of an inch long.

By inserting a current limiting means, such as a resistance, in series with the primary coil of the transformer, the number of turns of wire upon the primary coil may be substantially reduced. The current limiting means, however, reduces the voltage applied to the primary coil of the transformer so that the ratio of transformation must be increased somewhat in order to obtain the desired voltage upon or across the secondary coil. Preferably a resistance is used in series with the primary winding of the transformer.

The secondary winding of the transformer should have a high resistance, reactance, or both, so that the current flow through the secondary winding and across the space between the electrocuting electrodes when an insect is electrocuted, will be low enough to cause an electric discharge of low energy so that the electrodes will not be damaged, also unsightly illuminating means is thereby avoided.

The turns on the primary coil of the transformer having a resistance in series therewith are considerably less than the turns required upon the primary of a transformer connected directly across the electrical lighting lines as will appear more fully hereinafter.

The resistance connected in series with the primary coil of the transformer may be a variable resistance but preferably an incandescent lamp is used for this purpose. An incandescent lamp, when used as the resistance in series with the primary winding, provides also an illuminating means and when the current through the incandescent lamp is sufficient to give good illumination, the illumination serves not only as an insect lure but also as an illuminating device for general use. It will be obvious to anyone that the expense of operating the device having a lamp connected in series with the primary winding of the transformer will be always less than the cost of operating the lamp itself, as the current is reduced slightly in the case of the former due to the added impedance of the transformer.

The invention will be described more fully in the following description, reference being had to the accompanying drawings which illustrate certain specific embodiments of the invention, and in which:

Figure 1 is a diagrammatic view of an electrical circuit used for the insect exterminator showing an incandescent lamp as the resistance employed in series with the primary coil of the transformer.

Figure 2 is an elevational view of a combination ceiling lamp and insect exterminator in which the electrical connections to the electric lighting mains are made through a threaded lighting socket connection, the connection being made by screwing the device into an electric light socket.

Figure 3 is a partial cross-section, taken on line 3—3 of Figure 2, showing the arrangement of the insect exterminating conductors.

Figures 4 and 5 show, respectively, a vertical sectional and an elevational view of another form of combination ceiling light and insect exterminator showing the transformer mounted upon and within a housing which also supports a globe or light diffuser. The diffuser carries the electrodes of metallic members or conductors constituting the insect exterminator.

Figure 6 shows a hanging light and insect exterminator in which the covering globe or diffuser is conical in shape with the apex thereof at the bottom of the light and with the electrodes positioned upon this form of diffuser.

Figure 7 shows a form of combination light and insect exterminator in which the lighting means is mounted upon a pedestal which in turn is mounted upon a base, housing a transformer. In this form a decorative shade is employed to surround and conceal the insect exterminator.

The insect exterminator is shown in diagrammatic form in Figure 1 connected to the lighting circuit mains M. The insect exterminator comprises a transformer indicated generally as 10. The transformer has a primary winding or coil 11 connected in series with a resistance such as the lamp 12, although any resistance or impedance whether fixed or variable is suitable. A switch 13 may also be connected in series with the primary coil 11 and the lamp 12 to control the operation of the light and exterminator. A second switch 14 may be connected in series with the secondary winding, if desired, to disconnect the exterminator or render it inoperative and permit the lamp to remain illuminated.

The primary coil 11 is mounted upon an iron core 15 upon which is mounted the secondary winding or coil 16 of the transformer 10. One side of the secondary winding 16 is connected by means of the connection 23 with an electrode 17. The electrode 17 preferably comprises a plurality of spaced conductors 18. The other side of the secondary winding 16 is connected through a wire or conductor 24 with a second electrode 19 having preferably a plurality of spaced conductors 20. The conductors 18 and 20 are positioned alternately with respect to each other so that between each pair of conductors 18 there is a conductor 20 spaced therefrom. Similarly, between each pair of conductors 20 there is a conductor 18 spaced therefrom. Alternate conductors are therefore connected with opposite ends or sides of the secondary winding 16.

The electrodes 17 and 19, or specifically, their conductors 18 and 20, are spaced from each other a distance determined by the voltage or potential difference impressed upon the electrodes 17 and 19 respectively. In other words, if the voltage impressed upon the electrodes is capable of causing an electrical discharge across an air gap of three eighths of an inch, then the electrodes 17 and 19 and their conductors 18 and 20 should be spaced far enough apart so that the potential impressed upon the electrodes is normally incapable of producing such a result. The potential impressed upon the electrodes, however, should be great enough so that an insect will cause an electrical discharge across the gap between the conductors 18 and 20 so that a momentary current will pass therebetween through the insect and the insect will be electrocuted by the current. The insect will be electrocuted if it contacts with one of the conductors or any part of the electrodes or if it is in between the conductors without contacting therewith. The insect will also be electrocuted if it approaches adjacent to the electrodes even though it is not directly between the conductors but near enough so that it will cause an electrical discharge between the conductors.

With a resistance in series with the primary coil of the transformer, a larger diameter wire may be selected for the coil so that it has relatively little resistance. Such a primary winding will be principally a reactance within the circuit across the lighting mains M. With a reactance, represented by a primary transformer coil of 100 turns, in series with a resistance, represented by a lamp 12 of 150 watts or any other form of resistance whether fixed or variable, the effective voltage across the primary coil from a lighting circuit of 120 volts will be in the neighborhood of 4 volts, as an effective electromotive force. The effective voltage across the resistance in such case from an applied effective potential of 120 volts in the main lighting circuit will be approximately 116 volts. It will be observed therefore that the effective voltage across the resistance, such as an incandescent lamp, has not been reduced sufficiently to affect to any noticeable or material extent the degree of luminosity radiated by the lamp. With 100 turns in the primary coil or winding 11 of the transformer and with about 12,500 turns upon the secondary winding, a ratio of transformation of 125 is obtained. Since the power factor of the primary and secondary windings is not the same, the transformation ratio does not give an effective means of calculating the potential of the secondary winding. In the case above mentioned, the voltage of the secondary winding is approximately 3000 volts. The high impedance of the secondary winding limits the secondary current to a small value and makes it possible to design a unit free from danger to human beings.

The construction in its preferred form, with an incandescent lamp 12 in series with the primary winding 11 of the transformer 10 which steps up the electrical potential to the high voltage necessary upon the insect exterminating electrodes 18 and 20, produces a device which radiates the full or substantially the full lighting capacity of the lamp and enables a primary winding of very few turns to be sufficient to obtain an open circuit potential of about 3000 volts upon the insect exterminating electrodes. It would be reasonable to expect that the brilliancy of the incandescent lamp would be noticeably diminished by the series connection with the transformer so that a lamp of higher voltage would be necessary in order to give an illumination of the desired amount. Again it would be reasonable to expect that the voltage obtained across the secondary winding of the transformer, because of the low voltage applied to the primary winding brought about by the large voltage drop through the incandescent lamp, would be insufficient to electrocute an insect, yet the fact remains that a voltage of about 3000 volts is obtained across the secondary winding with an open circuit which is the condition existing in the device with the spaced electrodes.

Any one of the elements of the device described herein may be varied as desired which necessitates varying one of the other elements. For instance, if an incandescent lamp 12 of lower wattage and hence greater resistance is used, then the voltage across the primary winding 11 of the transformer 10 is reduced which would reduce the voltage across the secondary winding. The transformer characteristics can be changed such as to increase its ratio of transformation so that approximately 3000 volts is obtained across the secondary winding S of the transformer with an open circuit since this voltage is needed in order to cause a current discharge between the electrodes 18 and 20 when spaced about three eighths of an inch apart and through an insect thereupon. The transformer need not be altered, but instead the spacing between the electrodes 18 and 20 must be reduced so that the lower voltage applied thereto will be effective to cause a current discharge through an insect thereupon. The spacing between the electrodes 18 and 20 must be large enough, however, so that a current discharge will not take place therebetween excepting when an insect alights thereupon and reduces the resistance between the electrodes so that a current discharge through the insect takes place and the insect is electrocuted thereby.

Due to the fact that a high voltage may be impressed upon the electrodes 17 and 19 and their conductors 18 and 20 without diminishing to any noticeable degree the luminosity radiated by an incandescent lamp, the insect exterminator shown herein is particularly suited to be utilized as a combination illuminating device and insect exterminator. Such a combination device is shown in Figure 2 in which a base or housing 20 carries a threaded plug 21 adapted to be screwed into the usual house lighting socket. The housing 20 encloses the transformer. A glass or other transparent or translucent globe 22 is carried by the housing 20 to serve as a light diffuser and a carrier for the electrodes. The electrodes 17 and 19 are disposed upon the surface of the globe or diffuser 22 with the conductors 18 and 20 preferably disposed vertically thereupon. These conductors are in spaced relation with each other as shown and described with respect to the diagrammatic illustration shown in Figure 1. The electrode 17 is connected with one side of the secondary winding 16 of the transformer 10 through a connection 23 and the electrode 19 is connected to the other side of the secondary of the transformer through a connection 24. The globe or diffuser 22 is a completely enclosing globe and hence the electrodes 17 and 19 need be distributed only upon the outer surface thereof. It is self-evident that the electrodes may be disposed on any form of carrier or a carrier may be dispensed with when the electrodes have sufficient rigidity to support themselves in spaced relation.

The incandescent lamp serves as an illuminant and also as a lure. If the exterminator is not to be used as an illuminant, then of course the lamp may be substituted by a resistance and any other type or form of lure may be used.

The electrodes 17 and 19 including their conductors 18 and 20 are preferably thin strips of metallic foil secured to the surface of the diffuser 22. These thin metallic strips have ample current carrying capacity for the very small current flow which occurs only when an insect is being electrocuted. The thin strips of foil do not form any unsightly projections upon the diffuser and, in fact, they provide an artistic design which improves the appearance of the diffuser. The foil or electrodes may be formed into any desired design so long as the proper spacing is maintained or substantially maintained between the electrode 17 or its conductors 18 and the electrode 19 or its conductors 20. Electrodes of any other form or material is contemplated herein.

In Figures 4 and 5 there is illustrated a combination illuminating device and insect exterminator in the form of a ceiling light having a globe or diffuser which is open at one end. In this form of device the housing 30 is secured to the ceiling by means of the screws 31. A plate 32 completely encloses the transformer 10 within the housing 30. The transformer has a laminated core 15 upon which is wound the primary winding 11 and the secondary winding 16. The primary coil 11 is connected to one of the terminals of the lighting socket 33 so that the winding is in series with the incandescent lamp 12 adapted to be carried by the socket. The socket 33 is secured to the housing 30 by means of the screws 34 and one terminal thereof is adapted to be connected to one of the lighting circuit mains M. The other lighting circuit main is connected with the other side of the primary winding 11.

The secondary winding 16 of the transformer 10 is connected to the electrode 17 by means of the connection 23. The electrode 17 is positioned upon the exterior of the diffuser 35 and is provided with a plurality of spaced conductors 18 which preferably pass vertically along the outer surface of the open ended globe or diffuser 35. The conductors 18 bend around the lower edge of the diffuser 35 and pass upwardly upon the inner surface thereof and stop short at a point spaced from the top thereof. The electrode 19 is located upon the inner surface of the diffuser 35 adjacent the top thereof and is provided with a plurality of conductors 20 which are between and spaced from the conductors 18. The conductors 20 pass around the open lower end of the diffuser 35 and upwardly upon the exterior surface thereof. The conductors 20 stop at a point spaced from the top thereof. The diffuser 35 has, therefore, insect exterminating means upon both its exterior and interior surfaces. It should be noted that in this construction the same conductors are upon directly opposite sides of the wall of the diffuser 35 so that there will be no condenser effect between these conductors which would strain the material of the diffuser and tend to crack or otherwise damage the same.

A light housing of somewhat different form is shown in Figure 6 in which a conically shaped globe or diffuser 40 has been used. This diffuser is carried upon a housing 30 which housing however is suspended from a hook 41 and electrical connections may be made in any desired way to the transformer and lamp carried by the housing. A diffuser having a conical shape should also carry the conductors spaced apart at as nearly a uniform and predetermined distance as is possible from the conical form, the distance depending on the potential difference applied thereto from the secondary winding of the transformer. The conductors 42 and 43 show forms of conductors adapted to form electrodes for the conical shape of diffuser. The conductors 42 are widest at the top of the cone and taper to a narrow ribbon at the bottom of the cone. The conductors 43 are similarly tapered so that the spacing between the conductors will be uniform or as nearly so as is possible with a vertically directed member. Obviously, other arrangements and forms of electrodes and of the conductors 42 and 43 may be used to obtain a uniform spacing therebetween or at least a substantially uniform spacing. The conductors 42 are connected together by a band 44 and to one side of the secondary winding of the transformer by means of the connection 23. The conductors 43 are electrically connected together by a band 45 which forms part of the electrode and is connected to the other side of the secondary winding of the transformer by extending a connection 46 upwardly between the spaced ends of the band 44 to the other side of the secondary winding of the transformer within the housing 30. Any other connection which may be suitable is contemplated.

Another form of a combination illuminating device and insect exterminator is shown in Figure 7. This is a table form of light having a base 50 in which the transformer may be housed. The base carries a pedestal 51 upon which is mounted an insect exterminator 52. This insect exterminator may take any of the forms described or their equivalent or may take the form shown in Figures 4 and 5, although any other form is suitable. An incandescent lamp 53 is located centrally within the exterminator 52 so that it serves as an insect lure as well as an illuminating device. A shade 54 surrounds and conceals the insect exterminator 52 and forms a decorative shield for the device as well as to provide the usual type of table reading light. The shade also provides a shield so that persons will not accidentally touch the high voltage carrying conductors and receive a shock.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawings, except as indicated in the appended claims.

What is claimed is:

1. An illuminating and insect exterminating device comprising, a transformer having secondary and primary coils, an electrical resistance in series with the primary coil which resistance during operation of the device is heated to incandescence and functions as an illuminant and an insect lure, and an insect exterminator comprising a series of electric conductors connected to one terminal of the secondary coil of the transformer, and a second series of electric conductors connected to the other terminal of the secondary of the transformer, the conductors of the respective series being spaced from each other, said conductors being located in proximity to said insect lure.

2. A combination illuminating and insect exterminating device comprising a transformer, an incandescent lamp, a globe surrounding said lamp, a series of elongated conducting members mounted upon said globe and connected to one terminal of the secondary coil of the transformer, a second series of elongated members mounted upon said globe and connected to the other terminal of the secondary of the transformer, the individual members of the first and second series being connected respectively to opposite terminals of the secondary of the transformer and being mounted upon said globe in adjacent spaced relation and functioning as an insect exterminator, the incandescent lamp and primary coil of the transformer being connected in electrical series whereby during operation of the device the lamp acts as an illuminant and insect lure.

3. A combination illuminating and insect exterminating device comprising, a plurality of adjacent metallic members in mutually spaced relation, a transformer having primary and secondary coils, and an incandescent lamp in series with the primary coil, the adjacent metallic members being connected alternately to the opposite ends of the secondary coil of the transformer whereby during operation of the device an insect between or adjacent thereto causes an electric circuit to be established through the insect to electrocute the latter.

4. An insect exterminating device comprising a transformer having a primary and a secondary winding, a resistance in series with the primary winding, an electrode connected with one side of the secondary winding of the transformer, and a second electrode connected with the other side of the secondary winding of the transformer, the electrodes being spaced apart a distance greater than the current discharging capacity through air at the potential impressed upon the electrodes.

5. An insect exterminating device comprising a transformer having a primary and a secondary winding, a resistance in series with the primary winding, an electrode connected with one side of the secondary winding of the transformer, a second electrode connected with the other side of the secondary winding of the transformer, the electrodes being spaced apart a distance greater than the current discharging capacity through air at the potential impressed upon the electrodes, and a lure adjacent to the electrodes.

6. An insect exterminating device comprising a transformer having a primary and a secondary winding, an incandescent lamp in series with the primary winding, an electrode connected with one side of the secondary winding of the transformer, and a second electrode connected with the other side of the secondary winding of the transformer, the electrodes being spaced apart a distance greater than the current discharging capacity through air at the potential impressed upon the electrodes.

7. An insect exterminating and illuminating device comprising a transformer having a primary and a secondary winding, an incandescent lamp in series with the primary winding, a globe surrounding the lamp, an electrode connected with one side of the secondary winding of the transformer and carried upon the surface of the globe, and a second electrode connected with the other side of the secondary winding of the transformer and carried upon the surface of the globe, the electrodes being spaced apart a distance greater than the current discharging capacity through air at the potential impressed upon the electrodes.

8. An insect exterminating and illuminating device comprising a transformer having a primary and a secondary winding, an incandescent lamp in series with the primary winding, a globe around the lamp, an electrode of metallic foil secured to the globe and connected with one side of the secondary winding of the transformer, and a second electrode of metallic foil secured to the globe and connected with the other side of the secondary winding of the transformer, the foil electrodes being spaced apart a distance greater than the current discharging capacity through air at the potential difference between electrodes.

9. An insect exterminating and illuminating device comprising a transformer having a primary and a secondary winding, an incandescent lamp in series with the primary winding, a light diffuser around the lamp having an open end, an electrode upon one surface of the diffuser and connected with one side of the secondary winding of the transformer, the electrode passing around the end of the diffuser and upwardly upon the other side thereof, and a second electrode of metallic foil secured to one surface of the diffuser and passing around the edge thereof and secured to the other surface of the diffuser so that the electrode portions upon both surfaces of the diffuser overlie each other, the electrode being connected with the other side of the secondary winding of the transformer, the electrodes being spaced apart a distance greater than the current discharging capacity through air at the potential difference between electrodes.

10. An insect exterminating and illuminating device comprising a base, a transformer housed within the base and having a primary and a secondary winding, a pedestal carried by the base, an incandescent lamp carried by the pedestal and connected in series with the primary winding, an electrode connected with one side of the secondary winding of the transformer, a second electrode connected with the other side of the secondary winding of the transformer, the electrodes surrounding the incandescent lamp and being spaced apart a distance greater than the current discharging capacity through air at the potential difference between electrodes, and a shade surrounding and concealing the lamp and electrodes.

11. An insect exterminating and illuminating device comprising a base, a transformer housed within the base and having a primary and a secondary winding, a pedestal carried by the base, an incandescent lamp carried by the pedestal and connected in series with the primary winding, a cylindrical electrode support surrounding the lamp, an electrode carried by the support and connected with one side of the secondary winding of the transformer, a second electrode carried by the support and connected with the other side of the secondary winding of the transformer, the electrodes surrounding the incandescent lamp and being spaced apart a distance greater than the current discharging capacity through air at the potential difference between electrodes, and a shade surrounding and concealing the lamp and electrodes.

12. An insect exterminating device comprising a transformer having a primary and a secondary winding, a current limiting means in series with the primary winding, an electrode connected with one side of the secondary winding of the transformer, and a second electrode connected with the other side of the secondary winding of the transformer, the electrodes being spaced apart a distance greater than the current discharging capacity through air at the potential impressed upon the electrodes.

WILLIAM J. BRADLEY.